(12) United States Patent
Erämaa et al.

(10) Patent No.: US 11,286,866 B2
(45) Date of Patent: Mar. 29, 2022

(54) INTERMITTENT INJECTION SYSTEM FOR A GAS TURBINE COMBUSTOR

(71) Applicant: Finno Energy Oy, Lahti (FI)

(72) Inventors: Timo Erämaa, Lahti (FI); Heikki J. Salminen, Lahti (FI)

(73) Assignee: Finno Energy Oy, Lahti (FI)

( * ) Notice: Subject to any disclaimer, the term of this patent is extended or adjusted under 35 U.S.C. 154(b) by 146 days.

(21) Appl. No.: 16/334,313

(22) PCT Filed: Sep. 13, 2017

(86) PCT No.: PCT/FI2017/050651
§ 371 (c)(1),
(2) Date: Mar. 18, 2019

(87) PCT Pub. No.: WO2018/050964
PCT Pub. Date: Mar. 22, 2018

(65) Prior Publication Data
US 2019/0203642 A1 Jul. 4, 2019

(30) Foreign Application Priority Data
Sep. 19, 2016 (FI) ...................... 20165704

(51) Int. Cl.
F02C 9/26 (2006.01)
F02C 3/30 (2006.01)
F02C 5/00 (2006.01)

(52) U.S. Cl.
CPC ................ F02C 9/266 (2013.01); F02C 3/30 (2013.01); F02C 3/305 (2013.01); F02C 5/00 (2013.01); F02C 9/26 (2013.01)

(58) Field of Classification Search
CPC .... F02C 9/26; F02C 9/266; F02C 5/00; F02C 3/30; F02C 3/305; F23R 7/00
See application file for complete search history.

(56) References Cited

U.S. PATENT DOCUMENTS

| 5,791,889 A | 8/1998 | Gemmen et al. |
| 2005/0019713 A1 | 1/2005 | Gutmark et al. |
| 2007/0144179 A1* | 6/2007 | Pinard ...................... F23R 7/00 60/776 |

(Continued)

FOREIGN PATENT DOCUMENTS

| GB | 2420615 A | 5/2006 |
| WO | 2004072451 A1 | 8/2004 |

OTHER PUBLICATIONS

Finnish Patent and Registration Office; Search Report in application No. FI20165704; dated Mar. 22, 2017; 1 page; Finnish Patent and Registration Office; Helsinki, Finland.

(Continued)

Primary Examiner — William H Rodriguez
(74) Attorney, Agent, or Firm — Chernoff, Vilhauer, McClung & Stenzel, LLP

(57) ABSTRACT

The gas turbine comprises a compressor, a combustor, and a turbine. The method comprises: compressing air with the compressor and feeding compressed air continuously to the combustor, feeding fuel to the combustor, continuously firing the mixture of fuel and gas in the combustor, feeding combustion gases from the combustor to the turbine, and supplying at least a portion of the total amount of fuel that is supplied to the combustor intermittently.

10 Claims, 2 Drawing Sheets

(56) References Cited

U.S. PATENT DOCUMENTS

Figure 1:
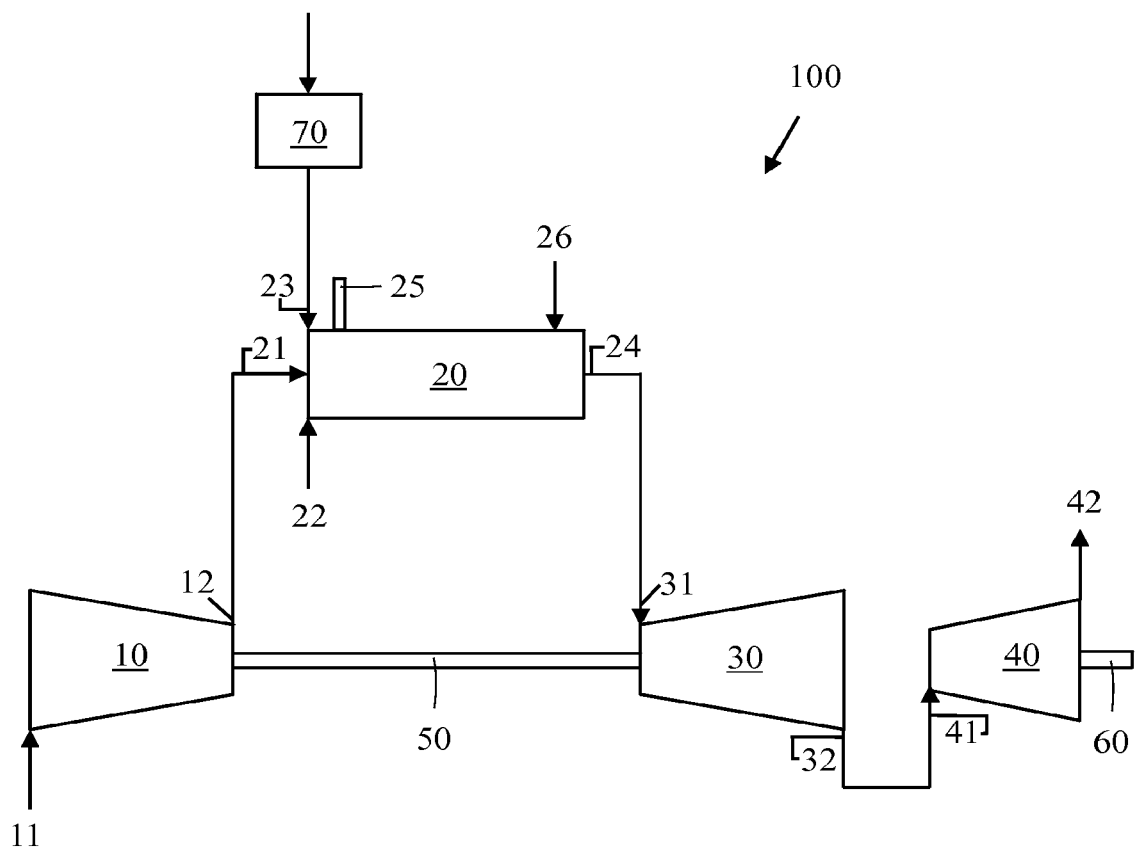

| | | | |
|---|---|---|---|
| 2008/0134684 A1* | 6/2008 | Umeh | F02C 9/46 |
| | | | 60/772 |
| 2010/0287943 A1 | 11/2010 | McMahan et al. | |
| 2014/0007584 A1* | 1/2014 | Hong | F02C 7/232 |
| | | | 60/776 |
| 2015/0260261 A1 | 9/2015 | Sonobe et al. | |
| 2016/0141659 A1* | 5/2016 | Yamamoto | H01M 8/04753 |
| | | | 429/414 |
| 2020/0191104 A1* | 6/2020 | Tanada | F02M 63/0029 |

OTHER PUBLICATIONS

European Patent Office; International Search Report in application PCT/FI2017/050651; dated Jan. 3, 2018; 3 pages; European Patent Office; Rijwsijk, Netherlands.

European Patent Office; Written Opinion of the International Searching Authority in application PCT/FI2017/050651; dated Jan. 3, 2018; 5 pages; European Patent Office; Rijwsijk, Netherlands.

\* cited by examiner

INTERMITTENT INJECTION SYSTEM FOR A GAS TURBINE COMBUSTOR

CROSS-REFERENCE TO RELATED APPLICATIONS

Not applicable.

FIELD

The present invention relates to a method for operating a gas turbine.

BACKGROUND OF THE INVENTION

A gas turbine is a type of internal combustion engine in which burning of an air-fuel mixture produces hot gases that spin a turbine to produce power. It is the production of hot gas during fuel combustion, not the fuel itself that gives gas turbines the name. Gas turbines can utilize a variety of fuels, including natural gas, fuel oils, and synthetic fuels. Combustion occurs continuously in gas turbines, as opposed to reciprocating internal combustion engines, in which combustion occurs intermittently. The hot gases produced in the combustor of the gas turbine can be used to drive one or more turbines.

A gas turbine may work according to a Brayton cycle in which fuel and/or air and/or some other medium is supplied continuously to the combustor. The Brayton cycle is a thermodynamic cycle that describes the working of a constant pressure heat engine. An ideal Brayton process comprises a) an isentropic process in which ambient air is drawn into the compressor, where it is pressurized, b) an isobaric process in which the compressed air runs through a combustion chamber, where burning fuel heats the air resulting in a constant pressure process, since the combustion chamber is open to flow in and out, c) an isentropic process in which the heated, pressurized air then gives up its energy, expanding through a turbine (or series of turbines), whereby some of the work extracted by the turbine is used to drive the compressor, d) an isobaric process in which heat is rejected in the atmosphere.

SUMMARY OF THE INVENTION

An object of the present invention is an improved method for operating a gas turbine.

The method for operating a gas turbine according to the invention is defined in claim 1, The method for operating a gas turbine comprising a compressor, a combustor, and a turbine, comprises:

compressing air with the compressor and feeding compressed air continuously to the combustor, supplying fuel to the combustor, continuously firing the mixture of fuel and gas in the combustor, feeding combustion gases from the combustor to the turbine, supplying at least a portion of the fuel that is supplied to the combustor intermittently to the combustor, and supplying steam intermittently to the combustor (20).

The intermittent supply of at least a portion of the fuel to the combustor will increase the efficiency of the gas turbine.

The gas turbine operates according to a Brayton cycle.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

Figure 2:
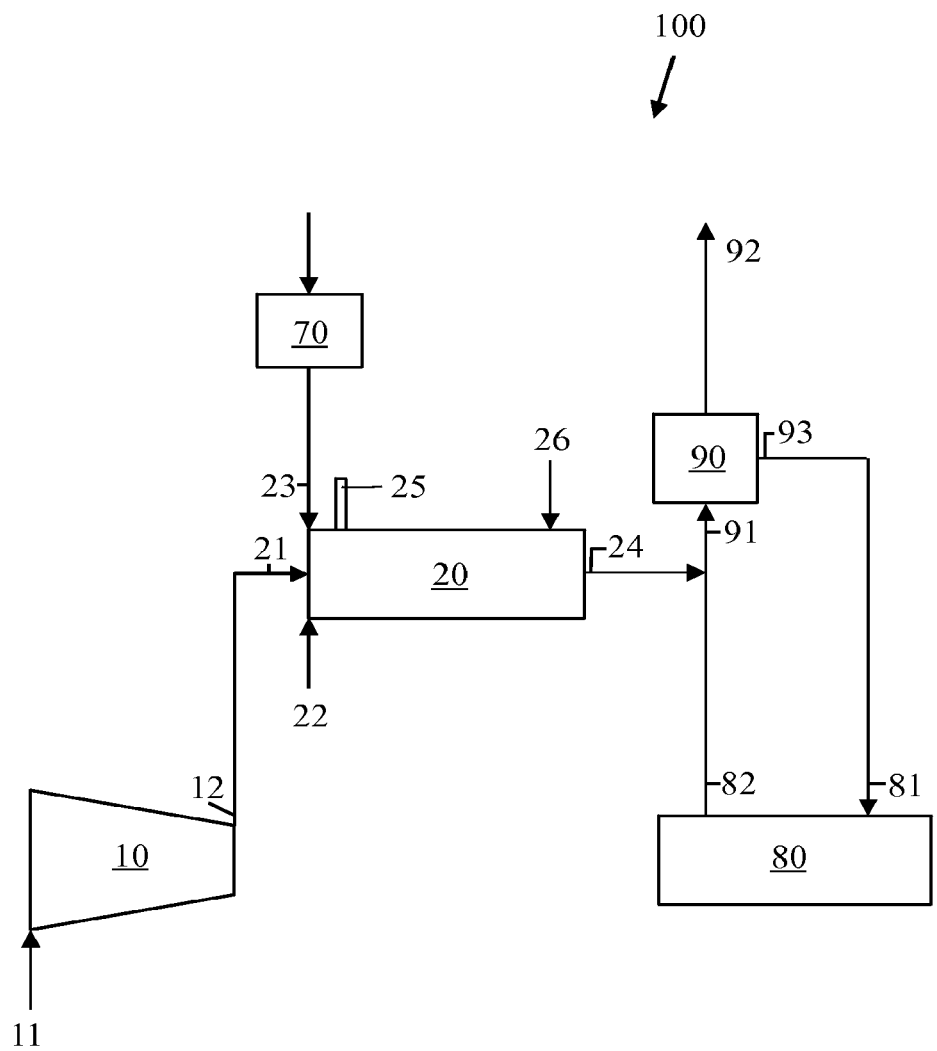

In the following the invention will be described in greater detail by means of preferred embodiments with reference to the attached drawings, in which:

FIG. 1 shows a first arrangement with of a gas turbine;
FIG. 2 shows a second arrangement with a gas turbine.

DETAILED DESCRIPTION OF PREFERRED EMBODIMENTS

FIG. 1 shows a first arrangement with a gas turbine. The arrangement 100 comprises a compressor 10, a combustor 20, a turbine 30, and a power turbine 40. The compressor 10 may comprise an air inlet 11 and an air outlet 12. The compressor 10 may suck air from the air inlet 11, compress the air, and feed the compressed air from the air outlet 12 of the compressor 10 to the air inlet 21 of the combustor 20. The combustor 20 or burner may comprise an air inlet 21 for the compressed air, a first fuel inlet 22, and a second fuel inlet 23. Compressed air may be fed from the air inlet 21 continuously to the combustor 20. Fuel may be supplied continuously to the first fuel inlet 22 and thereby into the combustor 20. Fuel may further be supplied intermittently through an injection valve 70 to the second fuel inlet 23 and thereby into the combustor 20. The combustor 20 may further comprise ignition means 25 for igniting the mixture of air and fuel in the combustor 20. The ignition is needed only at the beginning of the process. The burning in the combustor 20 is continuous once the mixture of air and fuel has been ignited. The hot airflow produced in the combustor 20 may be fed from the outlet 24 of the combustor 20 to the inlet 31 of the turbine 30. The compressor 10 and the turbine 30 may be connected with a shaft 50. The compressor 10 may thus rotate in synchronism with the turbine 30.

The injection valve 70 may be any kind of injection valve capable of injecting fuel to the combustor 20 only at predetermined time intervals. An electric pump may be used to pump fuel through pipes to the injection valve 70. The electric pump may pump more fuel than is needed for injection, whereby a loop circuit returns the excess fuel to the fuel tank via a pressure regulator, which keeps the pressure in the pipes constant. The injection valve 70 may be held closed by the force of a spring, and opened by the force of a solenoid. A control unit can control the solenoid to open the injection valve 70 at certain time intervals in order to deliver fuel in a burst to the combustor 20. A timed injection or a pulsed injection of fuel is thus achieved with the system.

The power turbine 40 may be positioned after the turbine 30. The output 32 of the turbine 30 may be connected to the input 41 of the power turbine 40. The combustion gases from the combustor 20 may pass first through the turbine 30, then through the power turbine 40 and then from the outlet 42 of the power turbine 40 as exhaust gases to the ambient air. The output shaft 60 of the power turbine 40 produces rotating power that may be used in a working machine connected to the output shaft 60.

The ignition means 25 may comprise one or more spark plugs distributed along a perimeter of the combustor 20.

The combustor 20 may further be equipped with a steam inlet 26 for supplying steam to the combustor 20. The steam is preferably injected intermittently into the combustor 20 with a high pressure. The pressure of the steam may be in a range of tens of bars to one hundred bars. The steam may be supplied in pulses to the combustor. The length of pulses during which steam is supplied to the combustor 20 and the length of the time between the pulses depends on the natural frequencies of the flow system and of the dimensions of the combustor 20. The inlet 26 may be positioned at the downstream end of the combustor 20 near the outlet 24 of the combustor 20, This is an advantageous position in the sense that the supply of steam will not disturb the burning process at the upstream end of the combustor 20.

The steam may be supplied intermittently form the steam inlet 26 to the combustor 20 in addition to the intermittent supply of fuel from the second fuel inlet 23 to the combustor 20 or instead of the intermittent supply of fuel to the combustor 20. The steam may be produced in a heat exchanger operatively connected to the combustor 20. Water is supplied to the heat exchanger and the water is heated within the heat exchanger with heat extracted from the combustor 20. The heat exchanger may be integrated into the combustor 20 or into the exhaust pipeline connecting the combustor 20 to the turbine 30 or it may be formed of a separate part. A primary circuit may be provided between the combustor 20 or the exhaust pipeline and the heat exchanger, whereby a medium is circulated in the primary circuit in order to transfer heat from the combustor or the exhaust pipeline to the heat exchanger. The heat may then be transferred from the primary circuit to the water in the heat exchanger in order to produce steam in the heat exchanger. The steam may on the other hand be produced outside the gas turbine 100.

FIG. 2 shows a second arrangement with a gas turbine. The arrangement 100 comprises a compressor 10, a combustor 20, a combustion engine 80, and a turbocharger 90. The compressor 10 may comprise an air inlet 11 and an air outlet 12. The compressor 10 may suck air from the air inlet 11, compress the air, and feed the compressed air from the air outlet 12 of the compressor 10 to the air inlet 21 of the combustor 20. The combustor 20 or burner may comprise an air inlet 21 for the compressed air, a first fuel inlet 22, and a second fuel inlet 23. Compressed air may be fed from the air inlet 21 continuously to the combustor 20. Fuel may be supplied continuously to the first fuel inlet 22 and thereby into the combustor 20. Fuel may further be supplied intermittently through an injection valve 70 to the second fuel inlet 23 and thereby into the combustor 20. The combustor 20 may further comprise ignition means 25 for igniting the mixture of air and fuel in the combustor 20. The hot airflow produced in the combustor 20 may be fed to the turbine of the turbocharger 90. The compressor 10 may in this embodiment be rotated by a separate power engine, which is not shown in the figure.

The exhaust of a combustion engine 80 may be connected to the turbine of the turbocharger 90 and the air outlet of the compressor of the turbocharger 90 may be connected to the air inlet in the combustion engine 80. The combustion gases from the combustor 20 may be directed together with the combustion gases from the combustion engine 80 through the turbine of the turbocharger 90 and further from the outlet 92 of the turbine of the turbocharger 90 as exhaust gases to the ambient air.

A recuperator may be used in the outlet 92 of the turbocharger 90 in order to recover energy from the exhaust gases of the turbocharger 90.

This second arrangement makes it possible to raise the boost pressure of the inlet air of the combustion engine 80 and to maintain a desired boost pressure at each moment regardless of the output of the combustion engine 80.

The compressor 10 and the combustor 20 as well as the fuel supply arrangement in FIG. 1 and in FIG. 2 may be identical.

The first fuel inlet 22 may be positioned on the air line between the output 12 of the compressor 10 and the air inlet 21 of the combustor 20, whereby fuel is pre-mixed with compressed air before entering the combustor 20. The first fuel inlet 22 may on the other hand be positioned directly on the combustor 20, whereby fuel is injected directly into the combustor 20.

The second fuel inlet 23 may be positioned on the air line between the output 12 of the compressor 10 and the air inlet 21 of the combustor 20, whereby fuel is pre-mixed with a portion of compressed air before entering the combustor 20. The second fuel inlet 23 may on the other hand be positioned directly on the combustor 20, whereby fuel is injected directly to the combustor 20.

A portion of the compressed air supplied by the compressor 10 may be used to be mixed with fuel introduced to a possible pre-combustor chamber positioned before the combustor 20 and the rest of the compressed air supplied by the compressor 10 is supplied to the combustor 20.

At least a portion of the fuel that is supplied to the combustor 20 is supplied intermittently.

This may be done so that a first portion of fuel is supplied continuously from the first fuel inlet 22 to the compressed air or directly to the combustor 20 and a second portion of fuel is supplied intermittently from a second fuel inlet 23 to the compressed air or directly to the combustor 20.

The fuel supplied form the second fuel inlet 23 of the combustor 20 may be supplied in pulses. The length of pulses during which fuel is supplied to the combustor 20 and the length of the time between the pulses depends on the natural frequencies of the flow system and of the dimensions of the combustor 20.

The amount of the second portion of fuel that is supplied intermittently to the combustor 20 may be in the range of 10-90% of the total amount of fuel supplied to the combustor 20. The amount of the second portion of fuel is chosen so that the efficiency of the gas turbine increases compared to a situation where fuel is fed only continuously to the combustor 20. The increased efficiency is due to the increased pressure and increased turbulence caused by the burn impulses.

The first portion of fuel and the second portion of fuel make together the total amount of fuel supplied to the combustor 20.

The arrangement for supplying fuel intermittently to the combustor 20 may be based on any prior art fuel injection systems including fuel injection systems using compressed air.

The combustor 20 may further be equipped with a steam inlet 26 for supplying steam to the combustor 20. The steam is preferably injected intermittently into the combustor 20 with a high pressure. The pressure of the steam may be in a range of tens of bars to one hundred bars. The steam may be supplied in pulses to the combustor. The length of pulses during which steam is supplied to the combustor 20 and the length of the time between the pulses depends on the natural frequencies of the flow system and of the dimensions of the combustor 20. The inlet 26 may be positioned at the downstream end of the combustor 20 near the outlet 24 of the combustor 20. This is an advantageous position in the sense that the supply of steam will not disturb the burning process at the upstream end of the combustor 20.

The steam may be supplied intermittently form the steam inlet 26 to the combustor 20 in addition to the intermittent supply of fuel from the second fuel inlet 23 to the combustor 20 or instead of the intermittent supply of fuel to the combustor 20. The steam may be produced in a heat exchanger operatively connected to the combustor 20. Water is supplied to the heat exchanger and the water is heated within the heat exchanger with heat extracted from the combustor 20. The heat exchanger may be integrated into the combustor 20 or into the exhaust pipeline connecting the combustor 20 to the turbine 30 or it may be formed of a separate part. A primary circuit may be provided between the combustor 20 or the exhaust pipeline and the heat exchanger, whereby a medium is circulated in the primary circuit in order to transfer heat from the combustor or the exhaust pipeline to the heat exchanger. The heat may then be transferred from the primary circuit to the water in the heat exchanger in order to produce steam in the heat exchanger. The steam may on the other hand be produced outside the gas turbine 100.

The term combustor 20 refers in this application to a combustor 20 formed of a single combustor 20 and to a combustor 20 formed of several separate combustors 20.

The pressure in a continuously operated prior art gas turbine is constant i.e. there are no major fluctuations in the gas pressure in the combustor 20. The intermittent supply of additional fuel from the second fuel inlet 23 will cause pressure fluctuations into the combustor 20. These pressure fluctuations will increase the average pressure within the combustor 20. This will increase the efficiency of the gas turbine.

In an embodiment in which additional fuel and additional steam is supplied intermittently to the combustor 20, the intermittent supply of additional fuel and the intermittent supply of additional steam may be synchronized with each other. The fluctuation in the pressure within the combustor 20 caused by the intermittent supply of additional fuel to the combustor 20 may be resembled by a first sine wave. The fluctuation in the pressure within the combustor 20 caused by the intermittent supply of steam to the combustor 20 may be resembled by a second sine wave.

These two sine waves may be synchronized so that the two sine waves oscillate in the same phase i.e. the sine waves strengthen each other. The pressure fluctuation within the combustor 20 will thus be strengthened. This may be an advantageous solution in a situation where steam having a high pressure and thereby also a high temperature is available.

These two sine waves may on the other hand be synchronized so that the two sine waves oscillate in a different phase in order to equalize each other i.e. to even out the pressure fluctuations in the combustor 20. This may be an advantageous solution in a situation where only steam having a fairly low pressure and thereby also a fairly low temperature is available.

The general aim is to minimize the flow losses of the gas and to maximize the additional energy obtained from the pressure fluctuation. The flow losses and the pressure within the combustor 20 can be measured in order to time the intermittent supply of fuel and/or the intermittent supply of steam to the combustor 20.

The figures show two examples of arrangements in which the inventive method may be applied. The inventive method is not restricted to these two examples, but may applied in any arrangements where a gas turbine is used. The compressor and the combustor form the basic elements of the gas turbine. The hot gases produced in the combustor may be used as such or in combination with other hot gases produced by other means to drive any kind of turbines.

The figures show only one fuel inlet 23 for supplying additional fuel intermittently to the combustor 20 and only one steam inlet 26 for supplying additional steam intermittently to the combustor 20. The combustor 20 may naturally be provided with one or more fuel inlets 23 and one or more steam inlets 26 distributed in any pattern along the combustor 20 for supplying additional fuel and/or steam intermittently to the combustor 20.

The continuous supply of fuel via the first fuel inlet 22 and the continuous supply of compressed air via the air inlet 21 may be positioned at an upstream end portion of the combustor 20. It is advantageous to start the burning process at the upstream end of the combustor 20.

The invention and its embodiments are not limited to the examples described above but may vary within the scope of the claims.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A method for operating a gas turbine comprising a compressor, a combustor, and a turbine, the method comprising:
   compressing air with the compressor and feeding compressed air continuously to the combustor,
   supplying fuel to the combustor,
   continuously firing the mixture of fuel and gas in the combustor,
   feeding combustion gases from the combustor to the turbine,
   supplying at least a portion of the total amount of fuel that is supplied to the combustor intermittently to the combustor, and
   supplying steam intermittently to the combustor where the supply of fuel and steam are varied in a manner timed so as to recover energy from pressure fluctuations caused by the variation in the supply of fuel and steam.

2. The method according to claim 1, characterized by supplying a first portion of fuel continuously to the combustor and supplying a second portion of fuel intermittently to the combustor.

3. The method according to claim 1, characterized by supplying a first portion of fuel continuously directly to the combustor and supplying a second portion of fuel intermittently directly to the combustor.

4. The method according to claim 1, characterized by supplying a first portion of fuel continuously from a first fuel inlet to the combustor and supplying a second portion of fuel intermittently from a second fuel inlet to the combustor.

5. The method according to claim 1, characterized by supplying a first portion of fuel continuously from a first fuel inlet directly to the combustor and supplying a second portion of fuel intermittently from a second fuel inlet directly to the combustor.

6. The method according to claim 2, characterized by supplying the second portion fuel to the combustor in pulses.

7. The method according to claim 2, characterized by selecting the amount of the second portion of fuel to be in the range of 10-90% of the total amount of fuel supplied to the combustor.

8. The method according to claim 1, characterized by supplying the steam to the combustor in pulses.

9. The method according to claim 1, characterized by substituting the intermittent supply of fuel to the combustor by an intermittent supply of steam to the combustor.

10. The method according to claim 1, characterized by synchronizing the intermittent supply of fuel and steam to the combustor so that the pressure fluctuation caused by the intermittent fuel supply in the combustor and the pressure fluctuation caused by the intermittent steam supply in the combustor either strengthen each other or equalize each other.

\* \* \* \* \*